US010021156B2

(12) United States Patent
Conway et al.

(10) Patent No.: US 10,021,156 B2
(45) Date of Patent: Jul. 10, 2018

(54) METHOD AND AN ELECTRONIC DEVICE FOR PERFORMING PLAYBACK AND SHARING OF STREAMED MEDIA

(71) Applicant: SPOTIFY AB, Stockholm (SE)

(72) Inventors: Frank Conway, Hoboken, NJ (US); Robert William Wood, New Rochelle, NY (US); Arvind Suresh, New York City, NY (US); Tobias Heinrich Schneider, Brooklyn, NY (US)

(73) Assignee: SPOTIFY AB, Stockholm (SE)

( * ) Notice: Subject to any disclaimer, the term of this patent is extended or adjusted under 35 U.S.C. 154(b) by 302 days.

(21) Appl. No.: 14/749,518

(22) Filed: Jun. 24, 2015

(65) Prior Publication Data

US 2016/0381106 A1 Dec. 29, 2016

(51) Int. Cl.
*H04L 29/06* (2006.01)
*G06F 3/0482* (2013.01)
*G06F 3/16* (2006.01)
*G06F 3/0488* (2013.01)

(52) U.S. Cl.
CPC ............ *H04L 65/60* (2013.01); *G06F 3/0482* (2013.01); *G06F 3/04883* (2013.01); *G06F 3/16* (2013.01); *H04L 65/1063* (2013.01); *H04L 65/4084* (2013.01)

(58) Field of Classification Search
CPC . H04L 65/60; H04L 65/1063; H04L 65/4084; G06F 3/16; G06F 3/0482; G06F 3/04883
USPC ........................................................ 715/716
See application file for complete search history.

(56) References Cited

U.S. PATENT DOCUMENTS

| 7,913,157 B1 | 3/2011 | Stoakley et al. |
| 2002/0042920 A1 | 4/2002 | Thomas et al. |
| 2003/0005437 A1* | 1/2003 | Feuer ............... G06Q 30/02 725/34 |
| 2007/0250901 A1 | 10/2007 | McIntire et al. |
| 2008/0052026 A1* | 2/2008 | Amidon ............ H04N 5/23203 702/104 |

(Continued)

OTHER PUBLICATIONS

Office Action dated Jun. 28, 2017 issued by U.S. Appl. No. 14/749,512, 14 pages.

*Primary Examiner* — John Repsher, III
(74) *Attorney, Agent, or Firm* — Tucker Ellis LLP (57) ABSTRACT

Described herein are methods and electronic devices for performing playback of streamed media, including uploading an associated second media content item while performing playback of a first media content item. In accordance with an exemplary embodiment, when performing playback of a first media content item, a message is sent to a computer server system, to return information that a service for sharing a related second media content item is selectable. The information is displayed at a user interface as a visual array of tiles, wherein each tile corresponds to a respective service. When a service is requested, a service data is processed, and the second media content item captured and uploaded with the requested service. By enabling a user to obtain media content items associated to the currently playbacked media content item, the user may find associated media content items, which he/she normally should not have been aware of.

22 Claims, 6 Drawing Sheets

(56) References Cited

U.S. PATENT DOCUMENTS

| | | | |
|---|---|---|---|
| 2012/0251082 A1* | 10/2012 | De Vos | H04N 5/765 386/285 |
| 2012/0278716 A1 | 11/2012 | Ye et al. | |
| 2013/0227471 A1* | 8/2013 | Cha | G06F 3/0488 715/790 |
| 2014/0095965 A1 | 4/2014 | Li | |
| 2014/0201631 A1 | 7/2014 | Pomprasitsakul et al. | |
| 2016/0192031 A1 | 6/2016 | Briggs et al. | |
| 2016/0337702 A1 | 11/2016 | Klappert et al. | |

\* cited by examiner

Fig. 6

METHOD AND AN ELECTRONIC DEVICE FOR PERFORMING PLAYBACK AND SHARING OF STREAMED MEDIA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present disclosure generally relates to the providing of media content. In particular, the embodiments of the present invention relate to methods of operating an electronic device and corresponding electronic devices for sharing media content.

BACKGROUND

As computer technology has improved, the digital media industry has evolved greatly in recent years. Users are able to use electronic devices such as mobile communication devices (e.g., cellular telephones, smart phones, tablet computers, etc.) to consume music, video and other forms of media content. For instance, users can listen to audio content (e.g., music) and/or watch video content (e.g., movies, television (TV) broadcasts, etc.) on a variety of electronic devices.

When performing playback of streamed media, e.g. listening to songs or watching a video, a user may sometimes be interested in acquiring further information related to the currently playbacked song or video. For instance, the user or media consumer may want to see the lyrics of a song or know background information of an artist, an album or a film.

Traditionally, music and other audio media have been offered on tapes, records, CDs (Compact Discs), etc, and buyers have received lyrics and other information together with the audio media, e.g. printed on an inner envelope.

Today, music is sometimes delivered by various streaming services to the consumers who listen to the music on electronic devices. When the consumers do not visit any music shop, he/she will then not be able to get the lyrics of the song together with the song or album which comprises the song.

Thus, there is a need to improve the user experience when delivering songs and other media content, e.g. through streaming services.

SUMMARY

It is in view of the above considerations and others that the various embodiments disclosed herein have been made.

It is a general object of the embodiments described herein to allow for an improved way of personalizing playback of media content, such as music or video, by complementing a media content item with an associated media content item.

This general object has been addressed by the appended independent claims. Advantageous embodiments are defined in the appended dependent claims.

In a first of its aspects, this disclosure concerns a method of operating an electronic device for performing playback of a streamed first media content item, and uploading a second media content item to a computer server system. The method comprises performing playback of the first media content item, and during the playback of the first media content item, sending a first data message to a computer server system, the first data message comprising instructions to the computer server system to return information that a service for sharing the second media content item is selectable, the second media content item being related to the first media content item. Furthermore, the method comprises, during the playback of the first media content item, receiving a second data message from the computer server system, the second data message comprising the information that the service for sharing the second media content item is selectable. In response to the second data message, it is displayed at the user interface as a visual array of tiles that the service for sharing the second media content item is selectable, wherein each one of the tiles corresponds to a respective service for sharing the second media content item according to the received information. Moreover, the method comprises receiving a first request for requesting the service for sharing the second media content item, and in response to the first request sending, to the computer server system, a third data message comprising instructions to return service data related to the requested service, receiving a fourth data message from the computer server system, the fourth data message comprising service data related to the requested service. Furthermore, the method comprises processing the service data, capturing the second media content item with the requested service and uploading the captured the second media content item to the computer server system with the requested service.

Furthermore, receiving the first request may comprise receiving a user input at a touch-sensitive surface of the user interface, e.g. in form of a swipe gesture, a tap gesture, a click gesture, etc. As well the second data message and the fourth data message may be received included in a media stream comprising the first media content item. The method may comprise determining one of the services for sharing based on the user input, and adjust the order of the tiles such that the tile corresponding to the determined service is displayed. The services for sharing second media content items may relate to capturing an audio content item, a video content item, a textual content item, etc. The service may supplement a preference of a social community when uploading the second media content item.

In a third of its aspects, this disclosure concerns an electronic device. The electronic device comprises a user interface, and a processor. The electronic device further comprises a memory which stores computer program code, which, when run in the processor causes the electronic device to perform the method actions of the first aspect.

In some embodiments, the electronic device is a stationary electronic device, such as a stationary computer. In alternative embodiments, a portable electronic device, such as a portable media presentation device, a mobile telephone, a cellular telephone, a tablet computer, a laptop computer, or a personal digital assistant.

In a fifth of its aspects, this disclosure concerns a computer program, comprising instructions which, when executed on at least one processor, cause the at least one processor to carry out the method according to the earlier-described first aspect. A carrier comprising the computer program may also be provided. The carrier may for example be one of an electronic signal, an optical signal, a radio signal, or a computer readable storage medium.

Various embodiments described herein may allow a user of an electronic device to select and utilize a service for uploading personally captured media content items associated with a currently playbacked media content item to a computer server system, e.g. a media server. Then other users who are performing playback of the same media content item may be enabled to obtain the personally captured associated media content items of the first user. By enabling a user to obtain media content items, e.g. information regarding an artist, which are associated to the currently playbacked media content item, according to other users, the user may find associated media content items, which he/she normally should not have been aware of. Thereby, he/she may perceive that the performance of the currently playbacked media content item increases.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

As described earlier, some existing solutions for delivery of streamed media content at a user interface of an electronic device may be inadequate. For example, existing solutions for playback of audio content may be perceived as limiting by some users. The inventors according to this disclosure have realized that users may want to share associated second media contents with each other. A first user who performs playback of a first media content item may consider that he/she wants to capture and associate a second media content item and share with other second users having a relationship with the first user. For instance, a first user may want capture an image which he/she associates with a song and share the image with friends who listen to the same song.

It is therefore a general object of embodiments described herein to allow for an improved playback of media content.

To address this, in accordance with an embodiment, described herein are an electronic device (e.g., a tablet computer or a smart phone) as well as a method of operating the electronic device for playback of media content played at a user interface of the electronic device. The example embodiments below disclose methods and arrangements by which an electronic device determines and displays information regarding which services those are selectable, and requests service data of a service selected by a user. The electronic device performs the requested service, captures a second media content item which the user considers is associated with a currently playbacked first media content item and, uploads the captured second media content item such that other users who are performing playback of the same first media content item may request the associated second media content item at their user interfaces.

Within this description, the term "media content" will be used to denote any type of media suitable for being playbacked on a speaker or a display of a user interface. For instance, media content may be realized in form of audio content, video contents, or image contents. "Media content items", are items of these media content forms. For instance, a media content item may be a song, a video, an image, a text, etc. Furthermore, a media content item may comprise more than one form of media content, e.g. a music video comprises typically both a video part to be displayed at a user interface, and a corresponding audio part to be played at a speaker of the user interface. It is also understood that media content comprises a sequence of media content items.

For instance an electronic device which receives streamed media content, receives a number of media content items in a stream from a media server.

Figure 1:
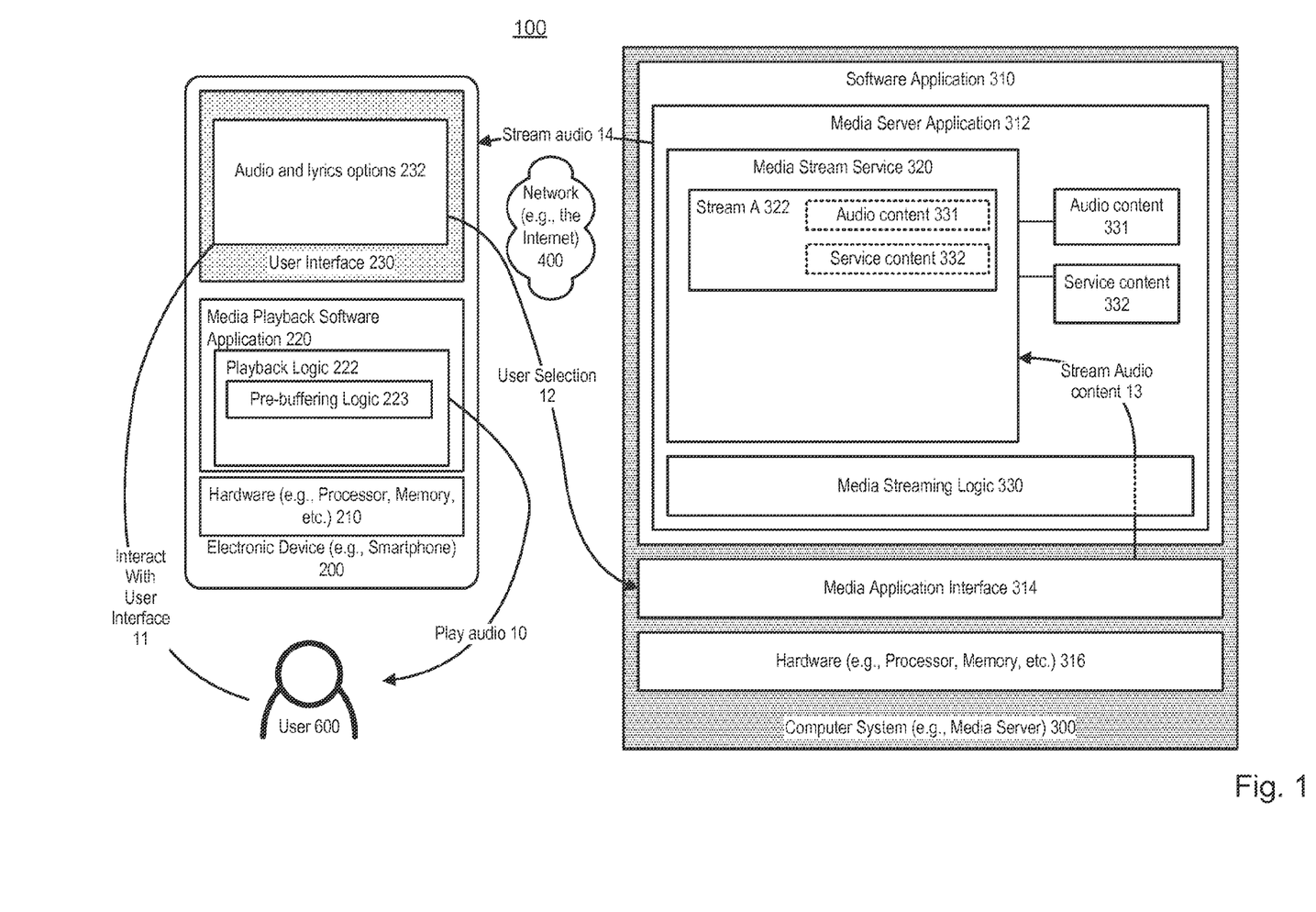
FIG. 1 illustrates a system for playback of audio content, in accordance with an embodiment.

Turning now to the figures, various embodiments of the invention will be described in further detail. FIG. 1 illustrates a system 100 for playback of media content, in accordance with an example embodiment. The system 100 may comprise an electronic device 200 and a computer system 300 operating as a media server. The electronic device 200 may be communicatively connectable to the computer system 300 via a network 400, such as the Internet, as is conventional and known in the existing art. As can be seen in FIG. 1, only a single electronic device 200 and a single computer system 300 are shown. However, the computer system 300 may support the simultaneous use of multiple electronic devices, and/or the electronic device 200 can simultaneously access video content at multiple computer systems.

In the following description, the media content will be exemplified to be audio content so as not to obscure the description of the embodiments disclosed herein with unnecessary detail. This should, however, not be interpreted as limiting the scope of the various embodiments of the invention.

As shown in FIG. 1, the electronic device 200 may be used for the playback of audio content complemented with lyrics content, which is provided by the computer system 300. The electronic device 200 may be a mobile telephone, such as a smart phone. Alternatively, the electronic device 200 may be a tablet computer. In yet other embodiments, the electronic device 200 may be any other electronic device capable of playback of audio content complemented with lyrics content, such as, for example, one of the electronic devices of the following group: a computer, a laptop computer, and a mobile electronic device (e.g. a handheld entertainment device, a digital media player, or other media device).

The electronic device 200 may include one or several physical computer resources, or hardware resources 210. The electronic device may further include a camera (not shown) and a microphone (not shown). Likewise, the computer system 300 operating as a media server may include one or several physical computer resources, or hardware resources 316.

The computer system 300 may include an operating system or other processing system which supports execution of a software application 310, including a media server application 312 which may be used, for example, to stream audio content and service content. A media stream service 320 may be used to buffer audio content 331 and service content 332, for streaming to one or more complemented audio streams 322. A media application interface 314 may receive requests from electronic devices 200 or other systems, to retrieve complemented audio content from the computer system 300.

Audio content or items 331 and service content or items 332 may be provided, for example, within a database or repository, or may be received by the computer system 300 from another source (not shown). This another source (not shown) may be external to the computer system 300, i.e. it may be located remotely from the computer system 300.

A media streaming logic 330 may be used to retrieve or otherwise access the audio content 331 and service content 332 in response to requests from electronic devices 200 or other systems, and populate the complemented stream service with streams 322 of corresponding audio content 331 and service content 332 that may be returned to the requesting electronic device 200.

In some embodiments, the electronic device 200 comprises a user interface 230. Typically, the user interface 230 includes a display 232 and a speaker (not shown) which is adapted to play the audio content. The display 232 is preferably, though not necessarily, a touch-sensitive display that is adapted to detect or otherwise determine a user input.

Selecting a service to be performed at the user interface 230 may be used, or otherwise interpreted, as a request or instruction to the media server application 312 to stream or otherwise return associated service data to an audio content which is being played. For example, in accordance with some embodiments, the software application 310 at the computer system 300 may be used to stream or otherwise communicate audio content complemented with associated service data to the electronic device 200, wherein the user interface 230 at the electronic device 200 is adapted to perform the selected service when playing the audio content at the speaker of the electronic device 200.

A user 600 may interact 11 with the user interface 230 and issue requests, for example the playing of a selected song (audio content) and performing the selected service on the electronic device 200. The user's selection that the service is requested may be communicated 12 to the media server application 312, via the media application interface 314. The media server application 312 may then be instructed 13 to stream corresponding audio content, including one or more streams of audio content data 331 and service data 332, and subsequently stream 14 or otherwise communicate to the user's electronic device 200. In accordance with some embodiments, pre-buffering requests from the electronic device 200 may also be communicated to the media server application 312 via the media application interface 314. At the electronic device 200, in response to the user's interaction with the user interface 230, the media playback application 220, including the playback logic 222, may play the associated audio content to the user 600, for example by playing back a song on the electronic device 200, as described in further detail below.

In addition, when the user 600 has selected and requested a service for sharing second media content items, the service is performed at the electronic device 200 and the second media content item is captured by the electronic device 200, e.g. with a camera, a microphone or via a display of the user interface 230. The captured second media content item is sent to the computer system 300 in order to be selectable for other users 600.

Figure 2:
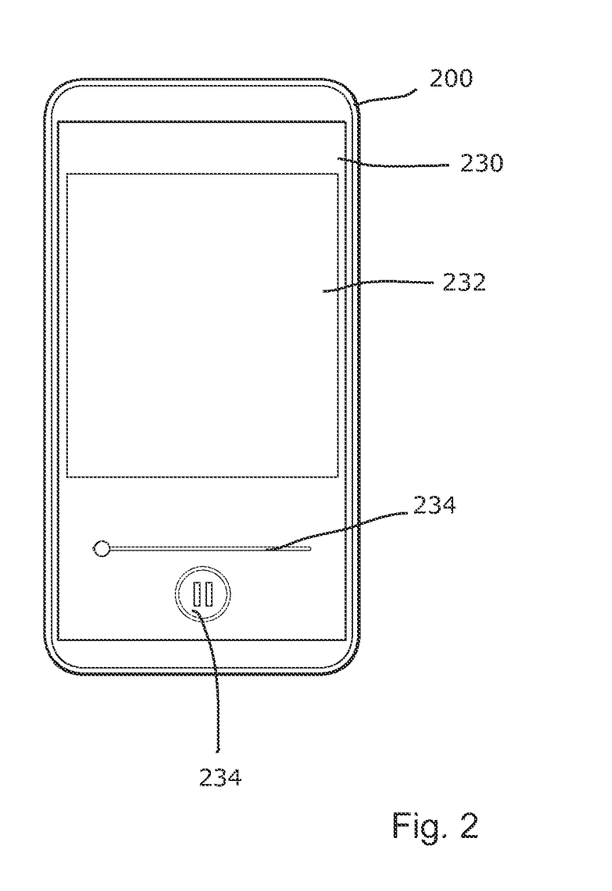
FIG. 2 illustrates a user interface of an electronic device.

FIG. 2 illustrates a smartphone 200, which is an example of an electronic device. The smartphone 200 comprises a user interface 230 which has a display 232 and user controls 234. In this example, the user controls 234 are arranged to control playback of streamed media content items at the user interface 230. In the figure the user controls 234 are illustrated as a pause control and a bar. The pause control will be shown during playback of a media content item, such that a user may pause the currently playbacked media content item by pressing or tapping the pause control. The bar will also be shown during the playback, such that the user may fast-forward the currently playbacked media content item by swiping the circle at the bar to an appropriate position.

Figures 3A, 3B:
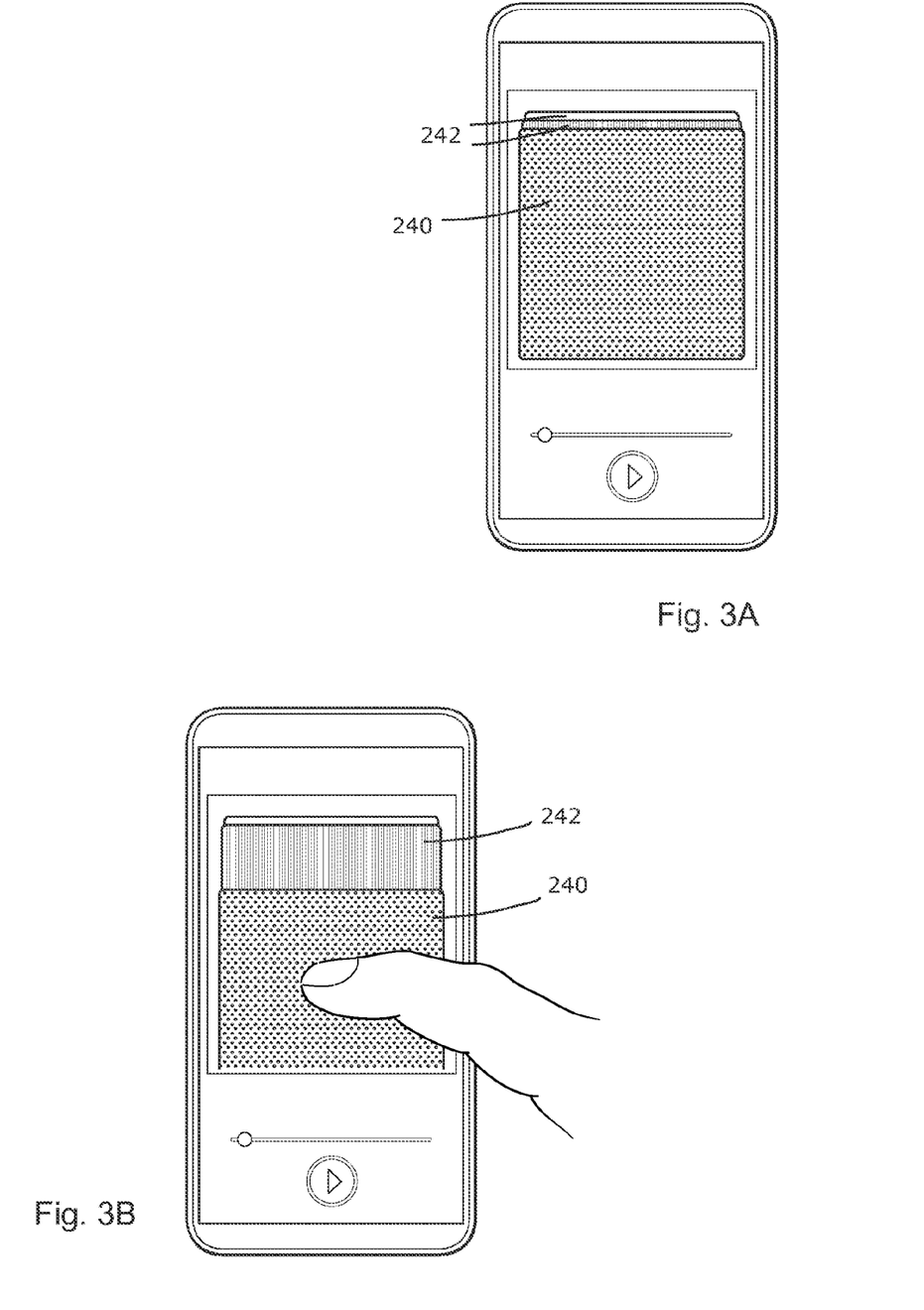
FIGS. 3A, 3B illustrate details of a user interface which support playback of audio content in accordance with some embodiments.

The FIGS. 3A-3B illustrates two example views of a user interface 230 of an electronic device 200 in accordance with some exemplifying embodiments.

The electronic device 200 which comprises an improved user interface 230 compared with the above described example will be disclosed, and the same reference numbers will be used when appropriate. In these embodiments the electronic device 200 is implemented as a smartphone. However, the disclosed concept is not limited to smartphones and the electronic device may alternatively be implemented as any other suitable type of electronic device with a user interface and which is capable of performing playback of streamed media content items. For instance, the concept may also be applied on a tablet computer, a laptop computer, a desktop computer, a PDA (Personal Digital Assistant), etc.

In FIG. 3A, a situation is illustrated where the smartphone 200 displays a plurality of tiles 240, 242 at a display of a user interface 230. In this embodiment, a graphic representation (not shown) of a currently playbacked media content item is displayed at a first tile 240. The currently playbacked media content item may be a song which is an audio item, and the shown graphic representation may then comprise an image, e.g. of an artist, or a music video associated with the song. Alternatively, the currently playbacked media content item may be a video item, and the graphic representation may be a still image or a low resolution version of a part of the music video. In the figure are also two further tiles 242 visible behind the tile 240. The tiles 240, 242, are displayed as a visual array of the tiles. The further tiles 242 indicates that services which are associated with the currently playbacked media content item are possible to request and utilize at the user interface 230. Some examples of such associated media content items will be shown below in some other exemplifying embodiments.

In FIG. 3B, a situation is illustrated where a user selects an associated service to the currently playbacked media content item. As seen in the figure, the user selects to request the associated service of a tile 242 which is decorated with a lined texture. The user performs a vertical swipe gesture with the finger and swipes the currently displayed tile 240 downwards in order display the tile 242 with the lined texture. In this embodiment, the currently playbacked media content item is a video item and the associated services are an image sharing service, and a comment sharing service, respectively. In another example the currently playbacked media content item is a song which is played at a speaker of the user interface. The associated service may than be an image sharing service, or a video sharing service, etc.

In the figure, the currently playbacked media content item is paused, which is indicated with a play symbol displayed at the user interface. Dependent on the types of the media content item, different ways of requesting and performing an associated service are suitable. For instance, when displaying a video item and the requested associated service is a comment sharing service, it is suitable to pause the video item while requesting and performing the service in order not to lose the user's attention. However, when playing a song and the requested service is an image sharing services, it is appropriate to continue to play the song when capturing images which the user associates with the song. In another embodiment, below, a method performed by an electronic device will be disclosed more detailed.

The principles of taking part of second associated media content items, e.g. second media content items which other users or media providers have considered to be associated with a specific first media content item, is disclosed in the co-filed U.S. patent application Ser. No. 14/749,512, filed on Jun. 24, 2015, entitled "A METHOD AND AN ELECTRONIC DEVICE FOR PERFORMING PLAYBACK OF STREAMED MEDIA INCLUDING RELATED MEDIA CONTENT", inventors Frank Conway et al, which is herein incorporated by reference in its entirety, and will therefore not be further disclosed within this description.

The FIGS. 4A-4D, which are schematic overviews, illustrate four situations where a user has requested different associated services. The electronic device comprises an improved user interface compared with some above described examples and the same reference numbers will be used when appropriate.

Figure 4A:
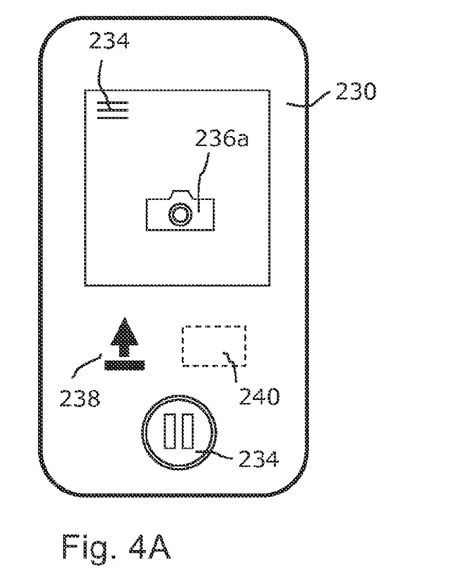
FIGS. 4A, 4B, 4C, 4D illustrate details of a user interface which support playback of audio content in accordance with some embodiments.

The FIG. 4A illustrates a user interface 230 of an electronic device 200. The currently playbacked first media content item is a song, i.e. an audio content item, and the user has selected an image sharing service. At the user interface an image capture user control 236a of the image sharing service is displayed. When the user listens to the song and wants to share a moment with other users, e.g. other users with who he/she has a relationship, the user utilizes the image sharing service and captures an image of a scene with a camera of the electronic device. The user captures the image by performing a user input, e.g. a tap gesture at the user control 236a. When the image is captured, it will be uploaded to a computer server system. In this embodiment, the user performs another user input, e.g. another tap gesture, at an upload user control 238, and the electronic device 200 sends the captured image to the computer server system.

In one related embodiment, the electronic device enables the user to select a specific community where the captured image will be uploaded by the computer server system. In this related embodiment a community user control 240 is arranged at the user interface 230 with which the user selects an appropriate social community.

By providing the user interface with functionality for enabling the user to select a community, the media content provider who delivers streamed media content items will be enabled to manage uploading also to a third party community, which he/she also is a registered user at.

For instance, a media server of the streaming provider A will, detect that the user wants to share a captured image with some social contacts at a community B where the user also is registered user. Thereby, the streaming provider A will be enabled to serve users who of a plurality of different social communities B, C, E, etc.

Figure 4B:
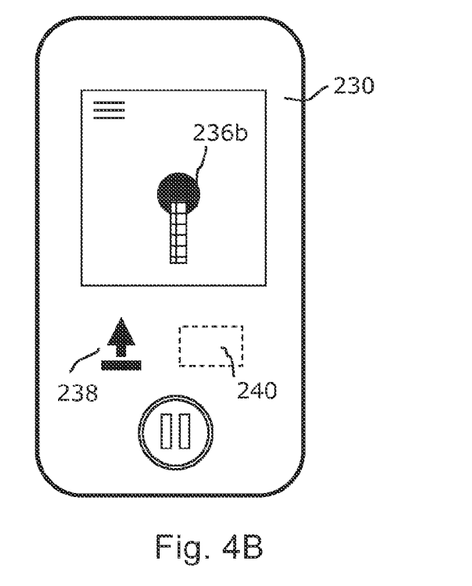

The FIG. 4B illustrates a corresponding situation to the situation of FIG. 4A. The situation differs in that the user has selected an audio sharing service instead of the image sharing service. Another user control 236b for capturing an audio content is item shown. Similarly, the user captures the audio content item by performing a user input, e.g. a tap gesture at the user control 236b. For example, the user who watches a video content item, e.g. an ice hockey match, may comment the match by recording an audio content item with a microphone at the user interface and upload the audio content item such that other users may take part of the comments when watching the match.

Figure 4C:
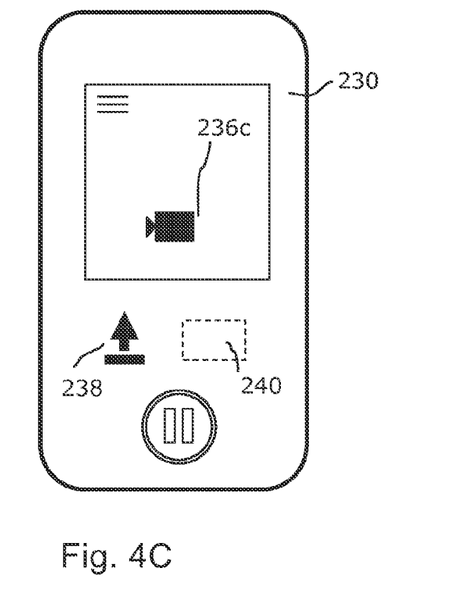

The FIG. 4C illustrates a corresponding situation to the situation of FIG. 4A. The situation differs in that the user has selected a video sharing service instead of the image sharing service. Another user control 236c for capturing a video content item shown. Similarly, the user captures the video content item by performing a user input, e.g. a tap gesture at the user control 236c. For example, the user who listens to an audio content item, may record a personal music video with a camera at the user interface and upload the music video, which is a video content item, such that other users may request the personal music video when listening to the same song.

Figure 4D:
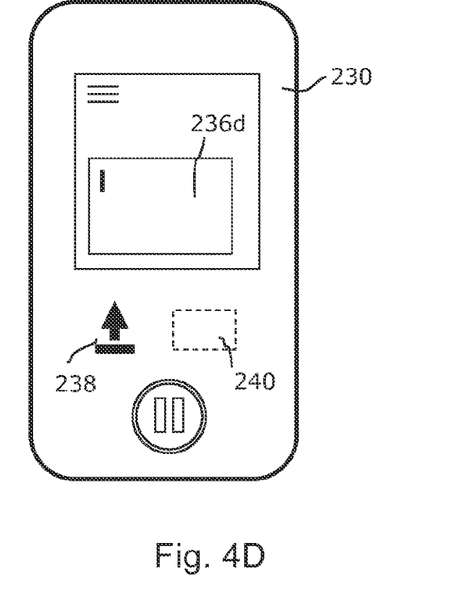

The FIG. 4D illustrates a corresponding situation to the situation of FIG. 4A. The situation differs in that the user has selected a text sharing service instead of the image sharing service. Another user control 236d for capturing a textual content item is shown. In this embodiment, the user control is a text-input-box 236b which is displayed at the user interface, e.g. at a touch sensitive surface of the user interface. The user is the enabled to input textual comments, e.g. at a virtual keyboard (not shown in the figure) of the user interface. For example, the user who listens to an audio content item, may input his/her comments, such that other users may request the comments when listening to the same song.

Furthermore, in the FIGS. 4A-4D are also some optional conventional user controls 234 shown, e.g. a menu control by which the user may open a menu, or a pause control by which the user may pause the currently played song. Typically, when pausing the song, the pause control turns into a play control by which the user may continue playback of the paused song.

Example Methods

With reference to the FIG. 5, which is a schematic flow chart, a method according to exemplifying embodiments herein will now be described.

Figure 5:
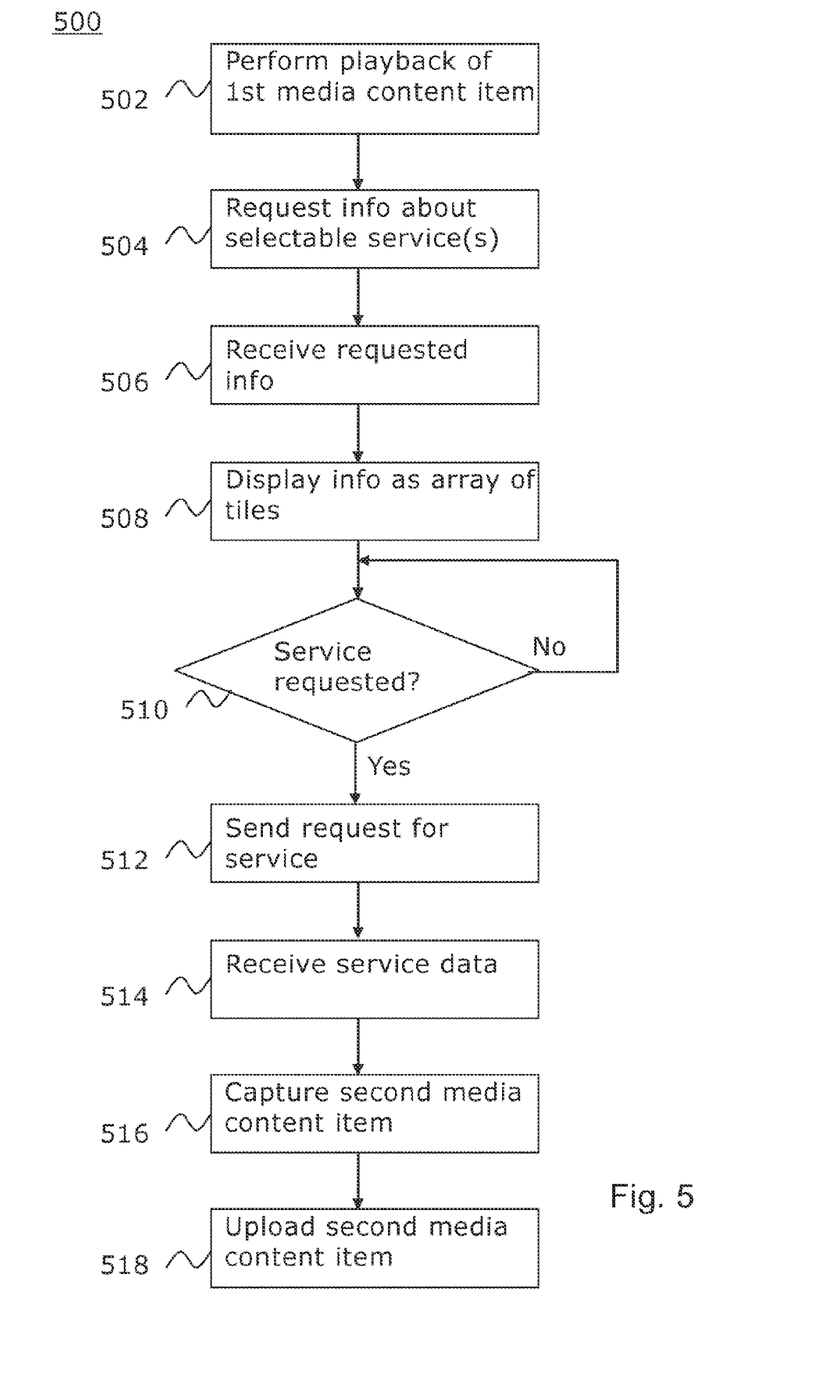
FIG. 5 illustrates a flowchart of a method according to another embodiment.

FIG. 5 illustrates an example method 500 of operating an electronic device for performing playback of a first media content item at a user interface and uploading a second media content item.

In a first action 502, playback of a first media content item is performed. For instance, a song, which is an audio item, is played by a speaker of the user interface, or a video item is displayed at a display of the user interface.

During the playback, in another action 504, the electronic device sends a first data message to a computer server system. The first data message comprises instructions to the computer server system to return information that one or more services for sharing second media content items are selectable. The second media content items are associated with the first media content item.

In a subsequent action 506, the information is received comprised in a second data message from the computer server system. This second data message may be included in a media stream comprising the first media content item, but may alternatively be sent separately by the computer server system instead.

In a following action 508, the electronic device displays that the services are selectable at the user interface as a visual array of tiles. Each one of the tiles corresponds to a respective service according to the received information of action 506. It is to be noted that the design of the tiles and the array may be implemented alternatively within the concept and is not limited to the design of the figures. For instance, the visual array of tiles may be designed as a set of tabs, a grid of icons, or any other suitable representation of the associated services.

In another action 510, the electronic device receives a first request for requesting the service. In this embodiment, the request is received as a tap gesture on a representation of the second media content at the user interface. The electronic device may continuously monitor if a request is received, which is indicated in the figure.

In response to the received request, in an action 512, the electronic device sends a third data message to the computer server system. This third data message comprises instructions to return the requested service. I.e. the electronic device requests the requested service from the computer server system.

In a following action 514, a fourth data message is received from the computer server system. This fourth data message comprises service data of the requested service, and may be received within a media stream which comprises the first media content item.

In a subsequent action 516, the electronic device processes the service data and captures the second media content item with the requested service.

In a final action 518, the electronic device uploads the captured second media content to the computer server system with requested service.

It is to be noted that the described solution is an example of a possible non-limiting implementation of the method, and that the method may be alternatively implemented within the disclosed concept. For instance, in a similar exemplifying embodiment as the above described one, the information that a service for sharing is available for selection is instead obtained before the starting the playback of the first media content.

Example Computer-Readable Mediums

Figure 6:
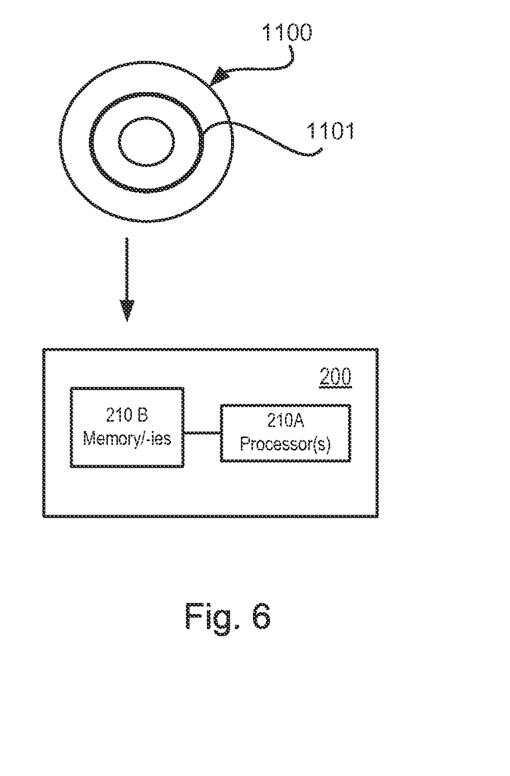
FIG. 6 illustrates an example of a computer program product according to an embodiment.

Turning now to FIG. 6, another embodiment will be briefly discussed. FIG. 6 shows an example of a computer-readable medium, in this example in the form of a data disc 1100. In one embodiment the data disc 1100 is a magnetic data storage disc. The data disc 1100 is configured to carry instructions 1101 that when loaded into a memory 210B for execution by a processor 210A of an electronic device 200, executes a method or procedure according to the embodiments disclosed in this disclosure. The data disc 1100 is arranged to be connected to or within and read by a reading device (not shown), for loading the instructions into the processor. One such example of a reading device in combination with one (or several) data disc(s) 1100 is a hard drive. It should be noted that the computer-readable medium can also be other mediums such as compact discs, digital video discs, flash memories or other memory technologies commonly used. In such an embodiment the data disc 1100 is one type of a tangible computer-readable medium. The instructions may alternatively be downloaded to a computer data reading device, such as a computer or other electronic device 200 capable of reading computer coded data on a computer-readable medium, by comprising the instructions in a computer-readable signal (not shown) which is transmitted via a wireless (or wired) interface (for example via the Internet) to the computer data reading device for loading the instructions into a processor 210A of the electronic device 200. In such an embodiment, the computer-readable signal is one type of a non-tangible computer-readable medium.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, while certain gestures (e.g., hovering gestures, press gestures, and tap gestures) have been described to exemplify some embodiments, other conceivable gestures also exist (e.g. flick gestures, swipe gestures, swipe-and-hold gestures, release-of-hold gestures) that could be contemplated when reducing embodiments described herein into practice.

Furthermore, it should be appreciated that embodiments described in this disclosure could be advantageously combined with any one of the embodiments described in the co-filed U.S. patent application Ser. No. 14/749,512, filed on Jun. 24, 2015, entitled "A METHOD AND AN ELECTRONIC DEVICE FOR PERFORMING PLAYBACK OF STREAMED MEDIA INCLUDING RELATED MEDIA CONTENT", inventors Frank Conway et al, which is herein incorporated by reference in its entirety.

Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

What is claimed is:

1. A method of operating an electronic device for performing playback of a streamed first media content item at a user interface of the electronic device, and uploading a second media content item to be associated with the streamed first media content item to a computer server system, the method comprising:
   performing playback of the streamed first media content item;
   during the playback of the streamed first media content item, sending a first data message to the computer server system, wherein the first data message comprises instructions to the computer server system to return an indication that one or more sharing services for sharing media content items to be associated with the streamed first media content item are selectable;
   receiving a second data message from the computer server system, wherein the second data message comprises the indication that the one or more sharing services are selectable;
   in response thereto displaying, at the user interface, as part of a visual array of tiles, the indication that the one or more sharing services are selectable, wherein each tile of the visual array of tiles corresponds to a respective sharing service of the one or more sharing services;
   receiving, at the user interface, an input indicative of a request for a selected service of the one or more sharing services;
   in response to receiving the request, sending, to the computer server system, a third data message comprising instructions to the computer server system to return service data associated with the selected service;
   receiving a fourth data message from the computer server system, wherein the fourth data message comprises the service data associated with the selected service;
   processing, at the user interface, the service data associated with the selected service;
   capturing, using the selected service, the second media content item to be associated with the streamed first media content item;
   during the capturing, using the selected service, the second media content item to be associated with the streamed first media content item,
      determining a media type of the streamed first media content item,
      upon determination that the media type of the streamed first media content item is a video media type, pausing the streamed first media content item during the capturing, and
      upon determination that the media type of the streamed first media content item is an audio media type, continuing playback of the streamed first media content item during the capturing; and
   uploading the captured second media content item to be associated with the streamed first media content item, to the computer server system, wherein the computer server system is configured to provide access to the captured second media content item to be associated with the streamed first media content item in association with playing of the streamed first media content item at another device.

2. The method of claim 1, wherein the user interface comprises a touch-sensitive surface, wherein receiving the request for the selected service comprises detecting a user input at the touch-sensitive surface, and wherein the user input comprises one or more of: a swipe gesture, a tap gesture, and a click gesture.

3. The method of claim 1, further comprising displaying a first user control at the user interface, wherein capturing, using the selected service, the second media content item to be associated with the streamed first media content item comprises at least one of: taking a photo, recording a video sequence, recording an audio sequence, and receiving a textual input.

4. The method of claim 1, wherein uploading the captured second media content item to be associated with the streamed first media content item comprises processing the captured second media content item to be associated with the streamed first media content item into a fifth data message and sending the fifth data message to the computer server system.

5. The method of claim 1, wherein receiving the second data message comprises receiving the indication that the one or more sharing services are selectable included in a media stream comprising the streamed first media content item.

6. The method of claim 1, wherein receiving the fourth data message comprises receiving the service data associated with the selected service included in a media stream comprising the streamed first media content item.

7. The method of claim 1, further comprising determining, based on the input indicative of the request for the selected service, which of the one or more sharing services is the selected service.

8. The method of claim 7, further comprising adjusting an order of the visual array of tiles, such that a tile corresponding to the determined service is displayed at the display.

9. The method of claim 1, wherein the streamed first media content item is a video item or an audio item, and capturing, using the selected service, the second media content item to be associated with the streamed first media content item comprises at least one of:
recording an audio sequence by a microphone of the user interface,
taking an image with a camera of the user interface,
recording a video sequence with a camera of the user interface, and
detecting a textual input in a fill-in form displayed at the user interface.

10. The method according to claim 1, further comprising detecting a second input at a second user control of the user interface, wherein the second input corresponds to a selection of a second computer server system, wherein
uploading the captured second media content item to be associated with the streamed first media content item comprises sending an identifier of the second computer server system to the computer server system, to cause the captured second media content item to be associated with the streamed first media content item to be sent to the second computer server system according to the identifier of the second computer server system.

11. An electronic device for performing playback of a streamed first media content at a user interface of the electronic device, and uploading a second media content item to be associated with the streamed first media content item to a computer server system, the electronic device comprising:
a user interface;
a processor; and
a memory storing computer program code, which, when run in the processor causes the electronic device to:
perform playback of the streamed first media content item;
during the playback of the streamed first media content item, send a first data message to the computer server system, wherein the first data message comprises instructions to the computer server system to return an indication that one or more sharing services for sharing media content items to be associated with the streamed first media content item are selectable;
receive a second data message from the computer server system, wherein the second data message comprises the indication that the one or more sharing services are selectable;
in response thereto display, at the user interface, as part of a visual array of tiles, the indication that the one or more sharing services are selectable, wherein each tile of the visual array of tiles corresponds to a respective sharing service of the one or more sharing services;
receive, at the user interface, an input indicative of a request for a selected service of the one or more sharing services;
in response to receiving the request, send, to the computer server system, a third data message comprising instructions to the computer server system to return service data associated with the selected service;
receive a fourth data message from the computer server system, wherein the fourth data message comprises the service data associated with the selected service;
process, at the user interface, the service data associated with the selected service;
capture, using the selected service, the second media content item to be associated with the streamed first media content item;
during the capture, using the selected service, the second media content item to be associated with the streamed first media content item,
determining a media type of the streamed first media content item,
upon determination that the media type of the streamed first media content item is a video media type, pausing the streamed first media content item during the capture, and
upon determination that the media type of the streamed first media content item is an audio media type, continuing playback of the streamed first media content item during the capture; and
upload the captured second media content item to be associated with the streamed first media content item, to the computer server system, wherein the computer server system is configured to provide access to the captured second media content item to be associated with the streamed first media content item in association with playing of the streamed first media content item at another device.

12. The electronic device of claim 11, wherein the user interface comprises a touch-sensitive surface, and wherein the memory stores computer program code, which, when run in the processor, causes the electronic device to receive the request for the selected service by detecting a user input at the touch-sensitive surface, the user input comprising one or more of: a swipe gesture, a tap gesture, and a click gesture.

13. The electronic device of claim 11, wherein the memory stores computer program code, which, when run in the processor, causes the electronic device to display a first user control at the user interface, and capture the second media content item by performing at least one of: taking a photo, recording a video sequence, recording an audio sequence, and receiving a textual input.

14. The electronic device of claim 11, wherein the memory stores computer program code, which, when run in the processor, causes the electronic device to upload the captured second media content item to be associated with the streamed first media content item by processing the captured second media content item to be associated with the streamed first media content item into a fifth data message and sending the fifth data message to the computer server system.

15. The electronic device of claim 11, wherein the memory stores computer program code, which, when run in the processor, causes the electronic device to receive the second data message by receiving the indication that the one or more sharing services are selectable included in a media stream comprising the streamed first media content item.

16. The electronic device of claim 11, wherein the memory stores computer program code, which, when run in the processor, causes the electronic device to receive the fourth data message by receiving the service data associated with the selected service included in a media stream comprising the streamed first media content item.

17. The electronic device of claim 11, wherein the memory stores computer program code, which, when run in the processor, causes the electronic device to determine, based on the input indicative of the request for the selected service, which of the one or more sharing services is the selected service.

18. The electronic device of claim 17, wherein the memory stores computer program code, which, when run in the processor, causes the electronic device to adjust an order of the visual array of tiles, such that a tile corresponding to the determined service is displayed at the display.

19. The electronic device of claim 11, wherein the memory stores computer program code, which, when run in the processor, causes the electronic device to playback the streamed first media content item as a video item or an audio item, and capture the second media content item by performing at least one of:
 recording an audio sequence by a microphone of the user interface,
 taking an image with a camera of the user interface,
 recording a video sequence with a camera of the user interface, and
 detecting a textual input in a fill-in form displayed at the user interface.

20. The electronic device of claim 11, wherein the memory stores computer program code, which, when run in the processor, causes the electronic device to detect a second input at a second user control of the user interface, wherein the second input corresponds to a selection of a second computer server system, and upload the captured second media content item to be associated with the streamed first media content item by sending an identifier of the second computer server system to the computer server system, to cause the captured second media content item to be associated with the streamed first media content item to be sent to the second computer server system according to the identifier of the second computer server system.

21. The electronic device according to claim 11, wherein the electronic device is a portable electronic device, including at least one of a mobile telephone, a cellular telephone, a tablet computer, a laptop computer, a personal digital assistant.

22. A non-transitory computer readable storage medium storing one or more programs, the one or more programs comprising instructions, which, when executed by an electronic device comprising one or more processors, cause the electronic device to perform a method of
 performing playback of a streamed first media content item;
 during the playback of the streamed first media content item, sending a first data message to a computer server system, wherein the first data message comprises instructions to the computer server system to return an indication that one or more sharing services for sharing media content items to be associated with the streamed first media content item are selectable;
 receiving a second data message from the computer server system, wherein the second data message comprises the indication that the one or more sharing services are selectable;
 in response thereto displaying, at the user interface, as part of a visual array of tiles, the indication that the one or more sharing services are selectable, wherein each tile of the visual array of tiles corresponds to a respective sharing service of the one or more sharing services;
 receiving, at the user interface, an input indicative of a request for a selected service of the one or more sharing services;
 in response to receiving the request, sending, to the computer server system, a third data message comprising instructions to the computer server system to return service data associated with the selected service;
 receiving a fourth data message from the computer server system, wherein the fourth data message comprises the service data associated with the selected service;
 processing, at the user interface, the service data associated with the selected service;
 capturing, using the selected service, a second media content item to be associated with the streamed first media content item;
 during the capturing, using the selected service, the second media content item to be associated with the streamed first media content item,
  determining a media type of the streamed first media content item,
  upon determination that the media type of the streamed first media content item is a video media type, pausing the streamed first media content item during the capturing, and
  upon determination that the media type of the streamed first media content item is an audio media type, continuing playback of the streamed first media content item during the capturing; and
 uploading the captured second media content item to be associated with the streamed first media content item, to the computer server system, wherein the computer server system is configured to provide access to the captured second media content item to be associated with the streamed first media content item in association with playing of the streamed first media content item at another device.

* * * * *